United States Patent
Eisen

(10) Patent No.: US 9,259,789 B2
(45) Date of Patent: Feb. 16, 2016

(54) INDEXABLE ASYMMETRIC CUTTING INSERT AND CUTTING TOOL THEREFOR

(71) Applicant: Iscar, Ltd., Tefen (IL)

(72) Inventor: Yaron Eisen, Kfar Vradim (IL)

(73) Assignee: Iscar, Ltd., Tefen (IL)

( * ) Notice: Subject to any disclaimer, the term of this patent is extended or adjusted under 35 U.S.C. 154(b) by 245 days.

(21) Appl. No.: 14/068,989

(22) Filed: Oct. 31, 2013

(65) Prior Publication Data

US 2015/0117971 A1 Apr. 30, 2015

(51) Int. Cl.
*B23B 27/16* (2006.01)
*B23C 5/20* (2006.01)
(Continued)

(52) U.S. Cl.
CPC ........... *B23B 27/1625* (2013.01); *B23C 5/08* (2013.01); *B23C 5/207* (2013.01); *B23C 5/2247* (2013.01); *B23B 2200/286* (2013.01); *B23B 2200/3627* (2013.01); *B23B 2200/3681* (2013.01); *B23B 2205/04* (2013.01); *B23C 2200/0416* (2013.01); *B23C 2200/085* (2013.01); *B23C 2200/086* (2013.01); *B23C 2200/125* (2013.01); *B23C 2200/165* (2013.01); *B23C 2200/205* (2013.01); *B23C 2210/168* (2013.01); *Y10T 407/1938* (2015.01); *Y10T 407/22* (2015.01); *Y10T 407/2284* (2015.01); *Y10T 407/235* (2015.01)

(58) Field of Classification Search
CPC ................. B23C 5/207; B23C 5/2247; B23C 2200/0416; B23C 2200/168; B23C 2200/205; B23B 27/1625; B23B 27/164; B23B 2200/0423; B23B 2200/3681; Y10T 407/23; Y10T 407/2272; Y10T 407/2274; Y10T 407/2282

USPC .................................. 407/113, 102, 103, 107
See application file for complete search history.

(56) References Cited

U.S. PATENT DOCUMENTS 3,754,309 A * 8/1973 Jones et al. ..................... 407/77
3,902,232 A * 9/1975 Hertel ............................ 407/104

(Continued)

FOREIGN PATENT DOCUMENTS

DE         1602795        4/1970
DE     102011056422 A1 * 6/2013  ...... B23B 2200/3681

(Continued)

OTHER PUBLICATIONS

International Search Report issued in PCT counterpart application (No. PCT/IL2014/050874) on Feb. 13, 2015.

*Primary Examiner* — Sunil K Singh
*Assistant Examiner* — Ryan Rufo
(74) *Attorney, Agent, or Firm* — Womble Carlyle Sandridge & Rice PLLC

(57) ABSTRACT

An indexable cutting insert has two cutting protrusions extending from opposite end surfaces towards a mid plane. Each cutting protrusion has a rear surface, an oppositely facing rake surface, a relief surface. A main cutting edge is formed at the intersection of the rake and relief surfaces, and extends between two main cutting edge ends. An edge projection is formed by a line connecting longitudinal projections of the main cutting edge ends of each main cutting edge. The edge projections of both of the main cutting edges form a non-zero first angle therebetween. The rake surfaces of the cutting protrusions are located on longitudinally opposite end surfaces of the cutting insert. Two clamping recesses and two abutment recesses serve as contact surfaces for clamping the cutting insert in an insert pocket of a cutting tool.

20 Claims, 4 Drawing Sheets

(51) Int. Cl.
*B23C 5/08* (2006.01)
*B23C 5/22* (2006.01)

(56) References Cited

U.S. PATENT DOCUMENTS

| | | | | |
|---|---|---|---|---|
| 4,462,725 A | * | 7/1984 | Satran et al. | 407/92 |
| 5,020,944 A | | 6/1991 | Pawlik | |
| 5,028,175 A | * | 7/1991 | Pawlik | 407/40 |
| 5,156,502 A | * | 10/1992 | Satran | 407/110 |
| 6,929,428 B1 | | 8/2005 | Wermeister et al. | |
| 7,553,112 B1 | | 6/2009 | Hecht et al. | |
| 8,449,225 B2 | * | 5/2013 | Gati | 407/107 |
| 2009/0162154 A1 | * | 6/2009 | Jonsson et al. | 407/114 |
| 2012/0099935 A1 | * | 4/2012 | Hecht | 407/100 |
| 2012/0269588 A1 | | 10/2012 | Kaufmann | |
| 2012/0282047 A1 | | 11/2012 | Choi et al. | |
| 2012/0315098 A1 | * | 12/2012 | Tamez et al. | 407/114 |
| 2013/0279996 A1 | * | 10/2013 | Mohseni | 407/102 |

FOREIGN PATENT DOCUMENTS

| | | | | |
|---|---|---|---|---|
| JP | 2007/118137 A | * | 5/2007 | B23B 27/14 |
| SU | 1180163 A2 | | 9/1985 | |
| WO | WO 2011/003120 A1 | * | 1/2011 | B23C 5/207 |
| WO | 2011/159119 | | 12/2011 | |
| WO | WO 2011/159119 A2 | * | 12/2011 | B23B 27/1625 |

\* cited by examiner

INDEXABLE ASYMMETRIC CUTTING INSERT AND CUTTING TOOL THEREFOR

FIELD OF THE INVENTION

The present invention relates to indexable cutting inserts and cutting tools therefor, in general, and to cutting inserts with two cutting portions and cutting tools therefor, in particular.

BACKGROUND OF THE INVENTION

Cutting tools as milling cutters, slotting cutters and saws have a plurality of cutting inserts retained on the peripheral surface of their tool body. The cutting inserts may have multiple cutting edges, and each insert me be indexable to use another cutting edge when a certain cutting edge is worn or damaged. The indexable cutting inserts may have two cutting edges, which are rotated relative to one another. The cutting tool body would have respective insert retaining portions suitable for receiving the indexable cutting inserts. Cutting inserts and cutting tools as described above are shown, for example, in DE1602795, U.S. Pat. Nos. 5,020,944, 7,553,112, US2012/269588 and in WO2011/159119.

SUMMARY OF THE INVENTION

In accordance with the subject matter of the present application, there is provided a cutting insert having a longitudinal insert axis extending perpendicular to an insert transverse mid plane, and comprising:

two end surfaces and a peripheral surface extending therebetween, the end surfaces being located on opposite sides of the mid plane, facing in opposite directions and being intersected by the longitudinal insert axis; and two insert portions extending on opposite sides of the mid plane, each insert portion comprising:
- a cutting protrusion extending longitudinally from one of the end surfaces in the direction of the mid plane, and having a rear surface, an oppositely facing relief surface, a rake surface, and a main cutting edge formed at the intersection of the rake and relief surfaces, the main cutting edge extending between two main cutting edge ends; and
- a clamping recess formed along the rear surface of the cutting protrusion;

wherein:
a line connecting longitudinal projections of the main cutting edge ends of each main cutting edge in a direction parallel to the insert axis forms an edge projection, and the edge projections of both of the main cutting edges form a non-zero first angle therebetween; and the rake surfaces of the cutting protrusions are located on opposite end surfaces of the cutting insert.

In accordance with another aspect of the subject matter of the present application, there is provided a cutting tool comprising:

a tool body with an outer surface, having at least one insert pocket formed on the outer surface; and at least one cutting insert as described above, retained in the at least one insert pocket.

In accordance with a further aspect of the subject matter of the present application, there is provided a cutting tool as described above, wherein:

the peripheral surface of the cutting insert has two abutment recesses, each extending away from a respective clamping recess in a direction parallel to the insert axis, the abutment recesses facing away from the insert axis;

each insert pocket comprises:
- a pocket abutment surface in contact with an insert abutment surface of either one of the abutment recesses of the cutting insert;
- a pocket clamping surface in contact with an insert clamping surface of a first of the clamping recesses of the cutting insert;
- a pocket support surface in contact with one of the rake surfaces of the cutting insert;

the cutting tool further comprises a clamping member having a member clamping surface and first and second member fixing surfaces, and when the cutting insert is located in the insert pocket, the clamping member is tightened to the insert pocket such that the member clamping surface presses against the insert clamping surfaces of a second of the clamping recess of the cutting insert.

BRIEF DESCRIPTION OF THE DRAWINGS

For a better understanding of the present invention and to show how the same may be carried out in practice, reference will now be made to the accompanying drawings, in which.

Figure 1:
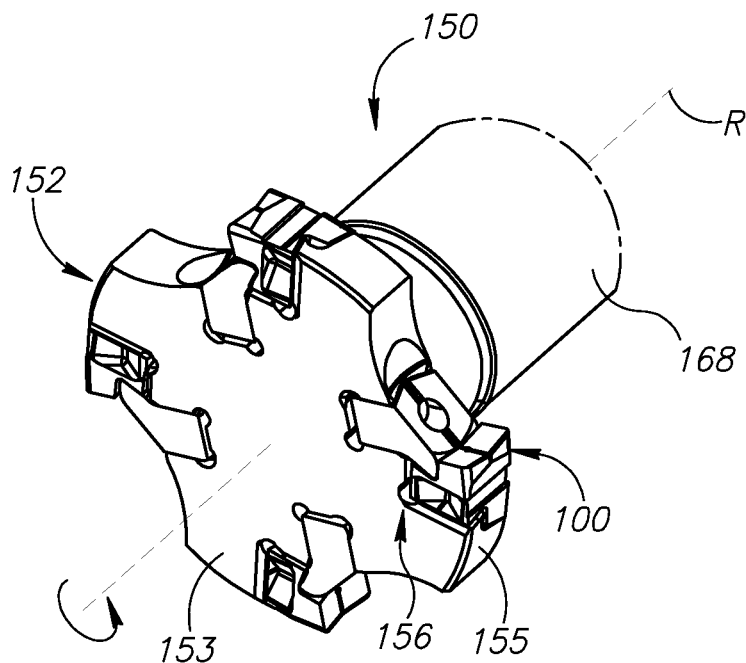
FIG. 1 is a perspective front view of a cutting tool according to an embodiment of the present invention.
Figure 2:
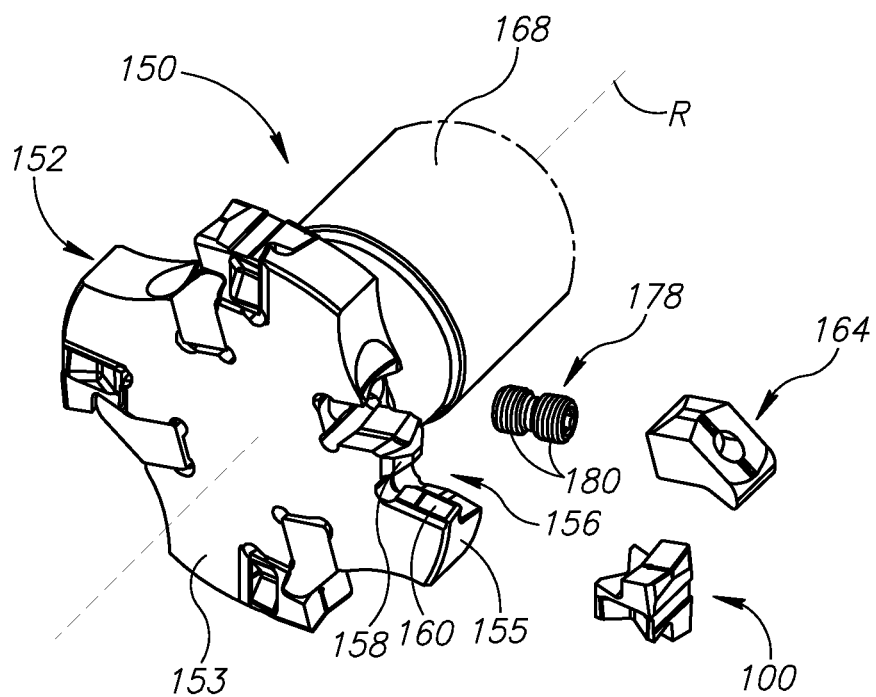
FIG. 2 is a view of the cutting tool of FIG. 1, partially disassembled.
Figure 3:
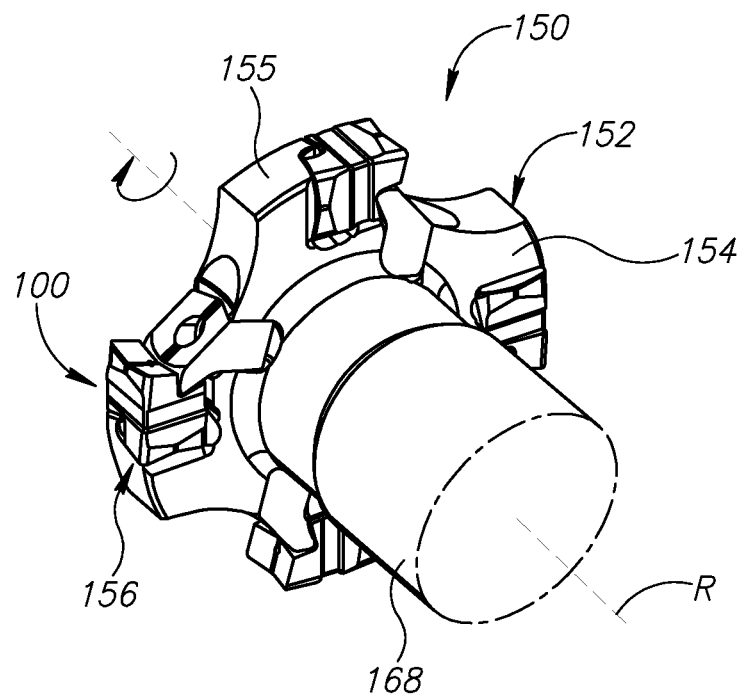
FIG. 3 is a perspective rear view of the cutting tool of FIG. 1.
Figure 4:
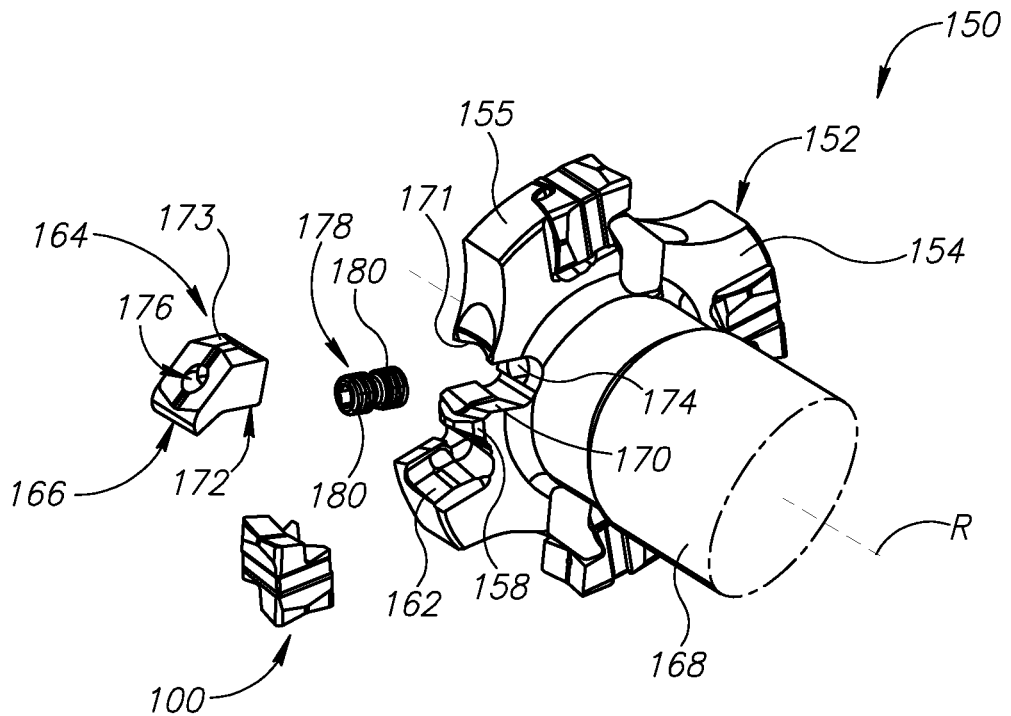
FIG. 4 is a view of the cutting tool of FIG. 3, partially disassembled.
Figure 5:
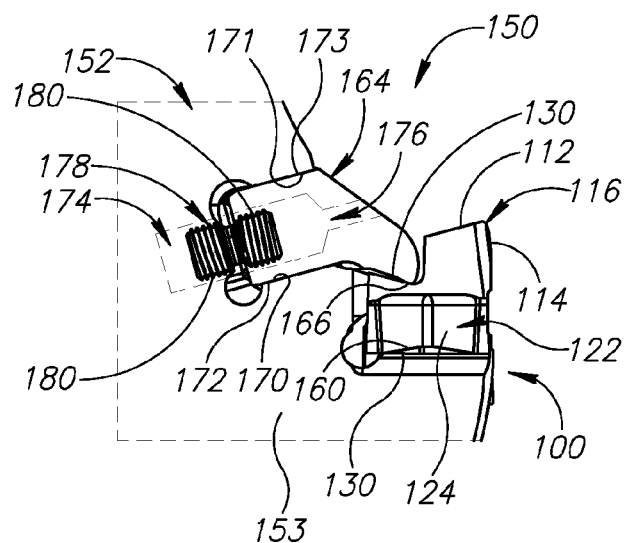
FIG. 5 is a partially transparent front view of a portion of the cutting tool of FIG. 1.
Figure 6:
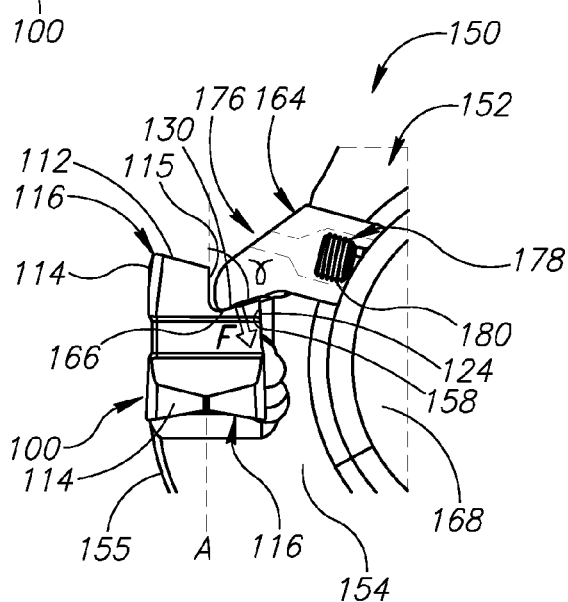
FIG. 6 is a partially transparent rear view of a portion of the cutting tool of FIG. 1.
Figure 7:
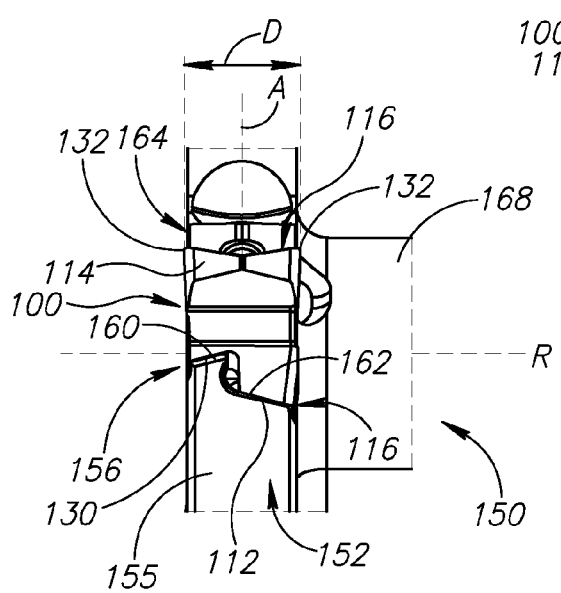
FIG. 7 is a side view of a portion of the cutting tool of FIG. 1.

It will be appreciated that for simplicity and clarity of illustration, elements shown in the figures have not necessarily been drawn to scale. For example, the dimensions of some of the elements may be exaggerated relative to other elements for clarity, or several physical components may be included in one functional block or element. Further, where considered appropriate, reference numerals may be repeated among the figures to indicate corresponding or analogous elements.

DETAILED DESCRIPTION OF THE INVENTION

In the following description, various aspects of the present invention will be described. For purposes of explanation, specific configurations and details are set forth in order to provide a thorough understanding of the present invention. However, it will also be apparent to one skilled in the art that the present invention may be practiced without the specific details presented herein. Furthermore, well-known features may be omitted or simplified in order not to obscure the present invention.

Reference is now made to FIGS. 1-7, depicting various views of a cutting tool 150, according to an embodiment of the present invention. The cutting tool 150 comprises a tool body 152 with a front surface 153, a rear surface 154 and an outer surface 155 extending therebetween. The outer surface 155 has a plurality of insert pockets 156 formed thereon. A cutting insert 100 is retained in each of the insert pockets 156.

Further reference is made to FIGS. 8-11, depicting various views of the cutting insert 100, according to an embodiment of the present invention. The cutting insert 100 has a longitudinal insert axis A extending perpendicular to an insert transverse mid plane P. The mid plane P is defined by intersecting transverse insert axes B, C which are perpendicular to each other and also to the longitudinal insert axis A. The cutting insert 100 has two end surfaces 102 and a peripheral surface 104 extending therebetween. The end surfaces 102 are located on opposite sides of the mid plane P, face in opposite directions and are intersected by the longitudinal insert axis A.

The cutting insert 100 includes two insert portions 106, each insert portion 106 located on an opposite side of the mid plane P. In each insert portion 106, a cutting protrusion 110 extends longitudinally from one of the end surfaces 102 in the direction of the mid-plane P. Each cutting protrusion 110 has a rear surface 115, an oppositely facing relief surface 114 and a rake surface 112. The rake surface 112 faces in a direction away from the mid plane P and generally in a direction of the longitudinal insert axis A and the relief surface 114 faces in a direction away from the longitudinal insert axis A. A main cutting edge 116 is formed at the intersection of the rake surface 112 and the relief surface 114. In a particular embodiment, as shown in the drawings of the present application, each main cutting edge 116 has two angled sub-edges 117, forming a V-shape main cutting edge 116. Each rake surface 112 may further have two angled sub faces 120, forming a V-shape rake surface 112. Each insert portion 106 includes a clamping recess 108 formed along the rear surface 115 of the cutting protrusion 110, (i.e., on the opposite side of the cutting protrusion 110 than the relief surface 114). In some embodiments, the clamping recess 108 may be located adjacent to the mid plane P.

Figure 9:
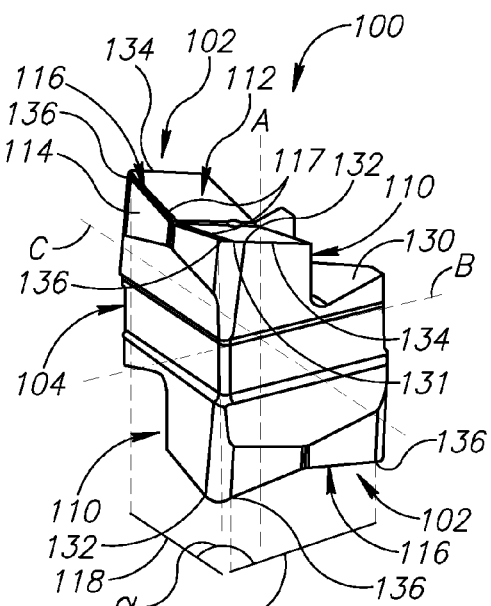
FIG. 9 is another perspective side view of the cutting insert of FIG. 8.
Figure 10:
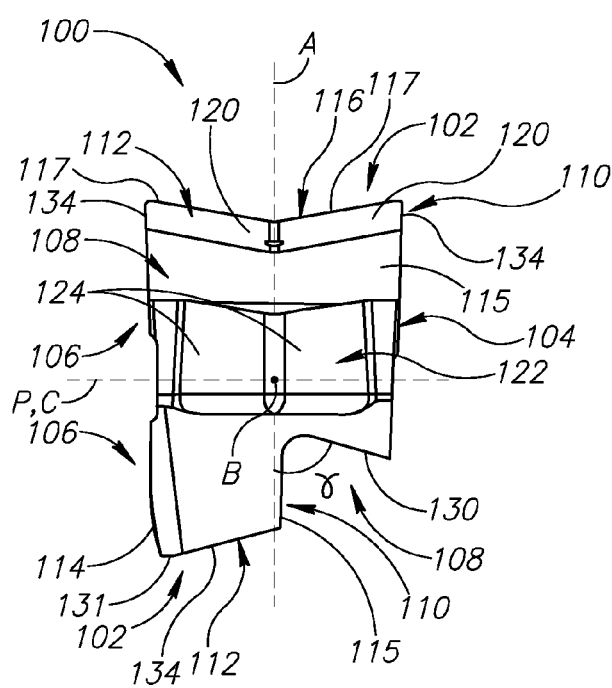
FIG. 10 is a side view of the cutting insert of FIG. 8.
Figure 11:
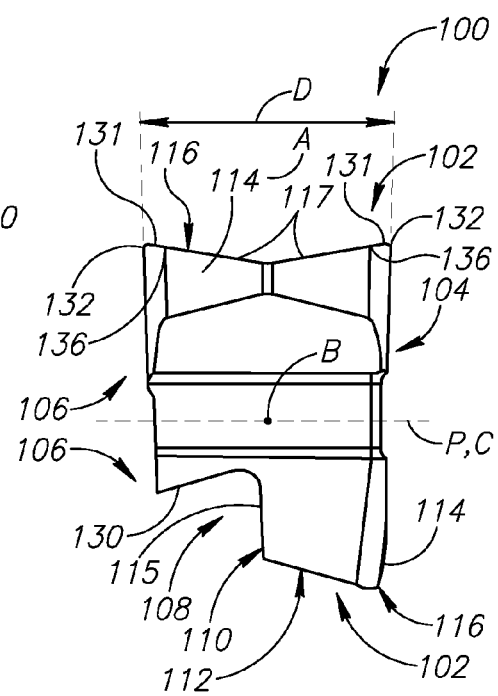
FIG. 11 is another side view of the cutting insert of FIG. 8, oppositely facing than the side view of FIG. 10.

With particular reference to FIG. 9, each main cutting edge 116 extends between two main cutting edge ends 136. A corner cutting edge 131 extends from the main cutting edge end 136 towards a corner cutting edge extremity 132. A secondary cutting edge 134 extends from the corner cutting edge extremity 132 along the respective rake surface 112, transversely to the main cutting edge 116.

The main cutting edge ends 136 of each main cutting edge 116 may be projected in a direction parallel to the insert axis A, and the line connecting these projections is indicated in FIG. 9 as an edge projection 118. The edge projections 118 of both of the main cutting edges 116 form a non-zero first angle α therebetween. Thus, both of the cutting protrusions 110 are similar to one another, located on opposite sides of the mid plane P and positioned at a first angle α relative to one another. In some embodiments the first angle α may be in the range of 30°-150°. In particular embodiments, the first angle α may be a 90° angle.

Furthermore, the rake surface 112 of each cutting protrusion 110 is located on an opposite end surface 102 of the cutting insert 100 (i.e., on a different one of the end surfaces 102, and on different sides of the mid plane P). It would be appreciated that the cutting insert 100 has an elongated form, with one longitudinal dimension, parallel to the insert axis A, and two smaller dimensions, transverse to the longitudinal dimension (e.g., extending along the edge projections 118).

Figure 8:
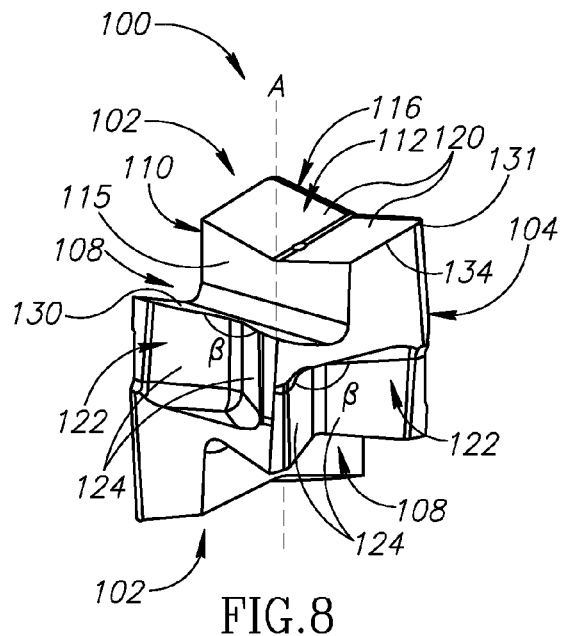
FIG. 8 is a perspective side view of a cutting insert according to an embodiment of the present invention.

With particular reference to FIG. 8, the peripheral surface 104 of the cutting insert 100 has two abutment recesses 122, each extending longitudinally away from a respective clamping recess 108 towards the opposite end surface 102. The abutment recesses 122 are positioned to face away from the insert axis A. In particular, each of the abutment recesses 122 is positioned to face a different direction away from the insert axis A. Each abutment recess 122 has at least one insert abutment surface 124, for abutment against a respective surface in the insert pocket 156, as elaborated herein below. The abutment recess 122 may have two insert abutment surfaces 124 thereon, forming an abutment angle β therebetween (indicated in FIG. 8). In a particular embodiment, the abutment angle β may be a 120° angle. Each abutment recess 122 may extend on both sides of the mid plane P such that the abutment recesses 122 overlap in the longitudinal direction along the longitudinal insert axis A. However, the clamping recesses 108 may not overlap along the longitudinal insert axis A.

As seen in the figures, the cutting insert 100, though indexable, is mirror asymmetric about the mid plane P and is rotationally asymmetric about the longitudinal insert axis A as well as the two intersecting transverse insert axes B, C which define the mid plane P. Thus, the cutting insert has symmetry only upon a rotation of 360° (or multiples thereof) about any of its axes A, B and C.

An insert clamping surface 130 extends obliquely in each clamping recess 108, from the adjacent abutment recess 122 towards the adjacent rear surface 115. In a side view of the cutting insert 100, as shown for example in FIGS. 6 and 10, each of the insert clamping surfaces 130 forms a clamping angle γ with the insert axis A. In some embodiments, the clamping angle γ may be an acute angle. In particular embodiments, the clamping angle γ may be in the range of 60°-80°.

Referring back to FIGS. 1-7, each insert pocket 156 of the cutting tool 150 has a pocket abutment surface 158, a pocket clamping surface 160 and a pocket support surface 162. When the cutting insert 100 is located within the insert pocket 156, the pocket abutment surface 158 receives the insert abutment surface 124 of one of the abutment recesses 122 of the cutting insert 100. The pocket clamping surface 160 receives the insert clamping surface 130 of one of the clamping recesses 108 of the cutting insert 100. The pocket support surface 162 receives one of the rake surfaces 112 of the cutting insert 100. The insert pocket 156 further includes first and second pocket fixing surfaces 170, 171. The first pocket fixing surface 170 extends from the pocket abutment surface 158 in a direction away from the outer surface 155 of the cutting tool body 152. The second pocket fixing surface 171 is located opposite to, and faces the first pocket fixing surface 170. The insert pocket has a fastening bore 174 located adjacent to the pocket fixing surfaces 170, 171, and extending in a direction away from the outer surface 155 of the cutting tool body 152.

The cutting tool 150 further includes a clamping member 164 for fastening the cutting insert 100 against the insert pocket 156. The clamping member 164 has an elongated shape, with a member clamping surface 166 at a forward end thereof, and first and second member fixing surfaces 172, 173 located rearwardly from the member clamping surface 166. The clamping member 164 also has a through hole 176 passing there through, extending along and passing between the member fixing surfaces 172, 173.

When the cutting insert 100 is placed in the insert pocket 156, the clamping member 164 is placed with the member clamping surface 166 facing the insert clamping surface 130, and a fastening screw 178 between the clamping member 164 and the insert pocket 156. The fastening screw 178 is threaded in the through hole 176 of the clamping member 164, and in the fastening bore 174 of the insert pocket 156. The fastening screw 178 may be actuated with a key inserted via an opening of the through hole 176 of the clamping member 164.

When the fastening screw 178 is fastened (e.g., as shown in the partially transparent FIGS. 5 and 6), the clamping member 164 is tightened to the insert pocket 156 such that the clamping member fixing surfaces 172, 173 contact the respective pocket fixing surfaces 170, 171, and the member clamping surface 166 presses against an operative one of the insert clamping surfaces 130 of the cutting insert 100. The member clamping surface 166 thereby applies a clamping force F on the operative insert clamping surface 130, to ensure firm clamping of the cutting insert 100 to the insert pocket 156. The cutting insert 100 is thus devoid of a clamping through hole, and it is attached to the insert pocket 156 by external clamping only, applied by the clamping member 164. Because of the clamping angle γ between the operative insert clamping surface 130 and the insert axis A, the force F has a force component aimed towards the holder body 152, thereby retaining the cutting insert 100 forced towards the holder body 152.

The fastening screw 178 may have two spaced apart threaded portions 180, for threadingly engaging respective threaded surfaces along the through hole 176 and the fastening bore 174. One of the threaded portions 180 of the fastening screw 178 is for left-hand threading while the other threaded portion 180 is for right-hand threading (i.e., opposite threading directions for attaching the clamping member 164 to the insert pocket 156). In another embodiment, the fastening screw may have a threaded portion and a screw head, the threaded portion engaging a respective threaded portion in the fastening bore 174, and the screw head adapted to press against a respective surface in the through hole 176. It is noted that the pocket fixing surfaces 170, 171 are constructed to prevent movement of the clamping member 164 transversely to the through bore 176.

When the cutting tool 150 is in an operational configuration, i.e., when the cutting insert 100 is mounted in the insert pocket 156 (FIGS. 1, 3 and 5-7), one of the cutting protrusions 110 is operational, while the other cutting protrusion 110 is non-operational. Since the rake surfaces 112 of the cutting protrusions 110 are located on different end surfaces 102 of the cutting insert 100, metal chips removed from the work piece by the cutting edges of the operational cutting protrusion 110 are formed as far away as possible from cutting edges of the non-operative cutting protrusion 110. Thereby contact is avoided between the cutting edges of the non-operative cutting protrusion 110 and the removed metal chips, such contact which may damage the cutting edges of the non-operative cutting protrusion 110.

As elaborated above, the end surfaces 102 and the peripheral surface 104 of the cutting insert 100 according to the present invention have a plurality of irregular surfaces, recesses, corners, intersections, and the like. Therefore, the production of such a cutting insert 100 may be achieved by injection molding, as producing such a cutting insert 100 by press molding would likely be more difficult.

When the cutting insert 100 is viewed along the mid-plane P, facing one of the relief surfaces 114 (e.g., FIGS. 7 and 11), an edge width D extending between the corner cutting edge extremities 132, is the largest dimension of the cutting insert 100 perpendicular to the longitudinal insert axis A. Thus, the cutting insert 100 may perform metal cutting, such as slotting, along the entire edge width D, without obstruction of the non-operative cutting protrusion 110.

The cutting tool 150 depicted in FIGS. 1-7 is a rotary tool having a central axis of rotation R, and the outer surface 155 of the cutting tool body 152 is the circumferential surface of the rotary tool. In the rotary tool, the tool body 152 is coupled with a tool shank 168 extending along the axis of rotation R. It would be appreciated that the present invention could be equally implemented in other types of cutting tools, other than rotary cutting tools.

While the present invention has been described with reference to one or more specific embodiments, the description is intended to be illustrative as a whole and is not to be construed as limiting the invention to the embodiments shown. It is appreciated that various modifications may occur to those skilled in the art that, while not specifically shown herein, are nevertheless within the scope of the invention.

What is claimed is:

1. A cutting insert (100) having a longitudinal insert axis (A) extending perpendicular to an insert transverse mid-plane (P), and comprising:
    two end surfaces (102) and a peripheral surface (104) extending therebetween, the end surfaces (102) being located on opposite sides of the mid-plane (P), facing in opposite directions and being intersected by the longitudinal insert axis (A); and
    two insert portions (106) extending on opposite sides of the mid-plane (P), each insert portion (106) comprising:
        a cutting protrusion (110) extending longitudinally from one of the end surfaces (102) in the direction of the mid-plane (P), and having a rear surface (115), a relief surface (114) facing in a direction opposite to that of the rear surface (115), a rake surface (112), and a main cutting edge (116) formed at the intersection of the rake and relief surfaces (112,114), the main cutting edge (116) extending between two main cutting edge ends (136); and
        a clamping recess (108) formed along the rear surface (115) of the cutting protrusion (110);
    wherein:
    a line connecting longitudinal projections of the main cutting edge ends (136) of each main cutting edge (116) in a direction parallel to the insert axis (A) forms an edge projection (118), and the edge projections (118) of both of the main cutting edges (116) form a non-zero first angle (α) therebetween; and
    the rake surfaces (112) of the cutting protrusions (110) are located on opposite end surfaces (102) of the cutting insert (100).

2. The cutting insert (100) according to claim 1, wherein the first angle (α) is in the range of 30°-150°.

3. The cutting insert (100) according to claim 2, wherein the first angle (α) is a 90° angle.

4. The cutting insert (100) according to claim 1, wherein the cutting insert (100) is devoid of a clamping through hole.

5. The cutting insert (100) according to claim 1, wherein a corner cutting edge (131) extends from each of the main cutting edge ends (136) towards a corner cutting edge extremity (132), and a secondary cutting edge (134) extends from each of the corner cutting edge extremities (132) along the respective rake surface (112), transversely to the main cutting edge (116).

6. The cutting insert (100) according to claim 1, wherein each main cutting edge (116) has two sub-edges (117) angled relative to one another, forming a V-shape main cutting edge (116).

7. The cutting insert (100) according to claim 1, wherein each rake surface (112) has two sub-faces (120) angled relative to one another, forming a V-shape rake surface (112).

8. The cutting insert (100) according to claim 1, wherein the peripheral surface (104) has two abutment recesses (122), each extending longitudinally away from a respective clamping recess (108) towards an opposite end surface (102), the abutment recesses (122) facing away from the insert axis (A).

9. The cutting insert (100) according to claim 8, wherein each of the abutment recesses (122) faces in a different direction away from the insert axis (A).

10. The cutting insert (100) according to claim 9, wherein each abutment recess (122) has at least one insert abutment surface (124).

11. The cutting insert (100) according to claim 8, wherein the abutment recess (122) has two insert abutment surfaces (124) thereon, forming an abutment angle (β) therebetween.

12. The cutting insert (100) according to claim 11, wherein the abutment angle (β) is a 120° angle.

13. The cutting insert (100) according to claim 8, wherein each of the two abutment recesses (122) extends on both sides of the mid plane (P) such that the two abutment recesses (122) overlap along the longitudinal insert axis (A).

14. The cutting insert (100) according to claim 13, wherein the clamping recesses (108) of the insert portions (106) do not overlap along the longitudinal insert axis (A).

15. The cutting insert (100) according to claim 1, wherein:
in each cutting protrusion (110), a corner cutting edge (131) extends on either side of the main cutting edge (116) towards a corner cutting edge extremity (132); and
in a view along the mid plane (P) facing one of the relief surfaces (114), an edge width (D) extending between the corner cutting edge extremities (132) is the largest dimension of the cutting insert (100) in a direction perpendicular to the longitudinal insert axis (A).

16. A cutting tool (150) comprising:
a tool body (152) having an outer surface (155) and at least one insert pocket (156) formed on the outer surface (155); and
at least one cutting insert (100) according to claim 1, retained in the at least one insert pocket (156).

17. The cutting tool (150) according to claim 16, wherein:
the peripheral surface (104) of the cutting insert (100) has two abutment recesses (122), each extending longitudinally away from a respective clamping recess (108), the abutment recesses (122) facing away from the insert axis (A);

each insert pocket (156) comprises:
a pocket abutment surface (158) in contact with an insert abutment surface (124) of either one of the abutment recesses (122) of the cutting insert (100);
a pocket clamping surface (160) in contact with an insert clamping surface (130) of a first of the clamping recesses (108) of the cutting insert (100);
a pocket support surface (162) in contact with one of the rake surfaces (112) of the cutting insert (100);
the cutting tool (150) further comprises a clamping member (164) having a member clamping surface (166) and first and second member fixing surfaces (172, 173), and
when the cutting insert (100) is located in the insert pocket (156), the clamping member (164) is tightened to the insert pocket (156) such that the member clamping surface (166) presses against the insert clamping surfaces (130) of a second of the clamping recesses (108) of the cutting insert (100).

18. The cutting tool (150) according to claim 17, wherein:
the insert pocket (156) further comprises first and second pocket fixing surfaces (170, 171);
the first pocket fixing surface (170) extends from the pocket abutment surface (158) in a direction away from the outer surface (155); and
the second pocket fixing surface (171) is located opposite to, and faces the first pocket fixing surface (170); and
first and second pocket fixing surfaces (170, 171) are in contact with the respective first and second member fixing surfaces (172, 173) of the clamping member (164).

19. The cutting tool (150) according to claim 18, wherein the cutting tool (150) is a rotary tool having an axis of rotation (R), and the outer surface (155) is the circumferential surface of the rotary tool.

20. The cutting tool (150) according to claim 18, wherein the insert pocket has a fastening bore (174) located adjacent to the pocket fixing surfaces (170, 171), and the clamping member (164) has a through hole (176), and a fastening screw (178) is threaded against respective threaded surfaces in the through hole (176) and the fastening bore (174).

\* \* \* \* \*